US010793760B2

(12) United States Patent
Al-Shafei et al.

(10) Patent No.: US 10,793,760 B2
(45) Date of Patent: *Oct. 6, 2020

(54) MODIFICATION OF BENTONITE PROPERTIES FOR DRILLING FLUIDS

(71) Applicant: Saudi Arabian Oil Company, Dhahran (SA)

(72) Inventors: Mansour A. Al-Shafei, Saihat (SA); Akram A. Alfliow, Dhahran (SA); Awad M. Al-Mofleh, Dhahran (SA); Jamal M. Al-Aamri, Juaymah (SA); Syed Rehan Ahmad Zaidi, Dhahran (SA); Amer A. Al-Tuwailib, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 39 days.

This patent is subject to a terminal disclaimer.

(21) Appl. No.: 16/104,742

(22) Filed: Aug. 17, 2018

(65) Prior Publication Data
US 2018/0355235 A1  Dec. 13, 2018

Related U.S. Application Data

(62) Division of application No. 15/088,990, filed on Apr. 1, 2016, now Pat. No. 10,081,751.

(51) Int. Cl.
C09K 8/05 (2006.01)
C09C 1/42 (2006.01)
(Continued)

(52) U.S. Cl.
CPC ............ C09K 8/05 (2013.01); C01B 33/40 (2013.01); C09C 1/42 (2013.01); C09K 8/03 (2013.01)

(58) Field of Classification Search
CPC combination set(s) only.
See application file for complete search history.

(56) References Cited

U.S. PATENT DOCUMENTS 4,605,505 A * 8/1986 Yanagida ............... C09K 8/22
507/113
5,292,908 A 3/1994 Onikata et al.
(Continued)

FOREIGN PATENT DOCUMENTS

CN  105174276 A  12/2015
JP  S57-128734  8/1982
(Continued)

OTHER PUBLICATIONS

Li et al, "Cellulose Nanocrystals and Polyanionic Cellulose as Additives in Bentonite Water-Based Drilling Fluids: Rheological Modeling and Filtration Mechanics", Ind. Eng. Chem. Res., 2016, 55(1), pp. 133-143, web publication date: Dec. 16, 2015 (Year: 2015).*

(Continued)

Primary Examiner — Frances Tischler
(74) Attorney, Agent, or Firm — Bracewell LLP; Constance G. Rhebergen; Kevin R. Tamm

(57) ABSTRACT

A method and composition for modifying bentonite to allow the bentonite to be useful in drilling mud applications. The method includes the steps of: preparing bentonite local to Saudi Arabia using raw water to remove contaminants from the bentonite; grinding the bentonite to a fine powder; sieving the fine powder to be between about 50 μm and about 150 μm in particle size to produce a sieved fine powder; mixing the sieved fine powder with polyanionic cellulose polymer to produce a modified bentonite composition; adding the modified bentonite composition to water until a homogeneous solution of modified bentonite in water is formed; and allowing the homogeneous solution of modi- (Continued)

fied bentonite in water to rest for about 16 hours to form a composition useful in drilling mud applications.

7 Claims, 2 Drawing Sheets

(51) Int. Cl.
*C09K 8/03* (2006.01)
*C01B 33/40* (2006.01)

(56) References Cited

U.S. PATENT DOCUMENTS

| | | |
|---|---|---|
| 2012/0152838 A1 | 6/2012 | Al-Jlil |
| 2014/0284281 A1 | 9/2014 | Al-Jlil |
| 2014/0291028 A1 | 10/2014 | Cortner et al. |
| 2014/0291029 A1 | 10/2014 | Cortner et al. |

FOREIGN PATENT DOCUMENTS

| | | |
|---|---|---|
| JP | H10298393 A | 11/1998 |
| JP | 2004196969 A | 7/2004 |
| JP | 2006206711 A | 8/2006 |
| JP | 2011136851 A | 7/2011 |
| WO | 199207919 A1 | 5/1992 |
| WO | 199311202 A1 | 6/1993 |

OTHER PUBLICATIONS

English translation of Maghrabi et al "Activation of Khulais Bentonite Using Fine Grinding Technique", King Abdulah University Magazine: M19 S1, pp. 35-53 (Year: 2008).*
Al-Homadhi, Emad, "Improving Local Bentonite Performance for Drilling Fluids Applications", SPE 110951, Society of Petroleum Engineers, May 7, 2007.
Dahab, A. S., "Thermal Stability of Drilling Fluids Prepared From Saudi Palygorskite", Journal of Canadian Petroleum Technology (Publication of the Petroleum Society of Canada), May 1991.
K. Song, et al., "Performance of Low Solid Bentonite Drilling Fluids Modified by Cellulose Nanoparticles", Journal of Natural Gas and Engineering 34, pp. 1403-1411, Aug. 15, 2016.
Al-Maghrabi and M. Aboushook. Activation of Khulais Bentonite Using Fine Grinding Technique. King Abdulaziz University, Jedda, Saudi Arabia, 2008.

* cited by examiner

MODIFICATION OF BENTONITE PROPERTIES FOR DRILLING FLUIDS

PRIORITY

This application is a divisional application of and claims priority to and the benefit of U.S. Non-Provisional patent application Ser. No. 15/088,990, filed on Apr. 1, 2016, the entire disclosure of which is incorporated herein by reference in its entirety.

BACKGROUND

Field

Embodiments of the disclosure relate to compositions for use in drilling fluids for hydrocarbon-bearing reservoirs. In particular, embodiments of the disclosure relate to drilling fluid compositions comprising modified bentonite.

Description of the Related Art

In hydrocarbon-bearing reservoirs, wellbores contain wellbore fluid from the first moment of formation until completion and production. Wellbore fluid serves several purposes, including well control (hydraulic pressure against the fluids in the hydrocarbon-bearing formation), wellbore wall integrity (hydraulic pressure on the wellbore wall and providing loss control additives) and lubricity (operating machinery). Wellbore fluid is in fluid contact with all portions of and everything in the wellbore not fluidly isolated, including tubulars internal to the fluid conduit, the wellbore annulus, and the wellbore wall. Other fluid conduits coupled to the wellbore often contain at least some wellbore fluid.

While drilling, drilling fluid (also referred to as drilling mud) fills the interior of the wellbore as the wellbore fluid. Some muds are petroleum-based materials and some are water-based materials. Petroleum-based materials comprise at least 90 weight percent of an oil-based mud (OBM). Examples of suitable base petroleum materials include crude oils, distilled fractions of crude oil, including diesel oil, kerosene and mineral oil, and heavy petroleum refinery liquid residues. A minor part of the OBM is typically water or an aqueous solution that resides internally in the continuous petroleum phase. Other OBM components can include emulsifiers, wetting agents and other additives that give desirable physical properties.

Oil-based muds also include synthetic oil-based muds (SOBMs). Synthetic oil-based muds are crude oil derivatives that have been chemically treated, altered or refined to enhance certain chemical or physical properties. In comparison to a crude temperature fraction of a partially-refined crude oil, which may contain several classes (for example, alkane, aromatic, sulfur-bearing, nitrogen-bearing) of thousands of individual compounds, a SOBM can comprise one class with only tens of individual compounds (for example, esters compounds in a C8-14 range). Examples of materials used as base fluids for SOBMs include linear alpha olefins, isomerized olefins, poly alpha olefins, linear alkyl benzenes and vegetable and hydrocarbon-derived ester compounds. SOBMs are monolithic systems that behave in a manner as if they were an oil-based mud but provide a more narrow and predictable range of chemical and physical behaviors.

While performing drilling operations, wellbore fluid circulates between the surface and the wellbore interior through fluid conduits. Wellbore fluid also circulates around the interior of the wellbore. The introduction of drilling fluid into the wellbore through a first fluid conduit at pressure induces the motivation for the fluid flow in the wellbore fluid. Displacing wellbore fluid through a second fluid conduit connected to the surface causes wellbore fluid circulation from the first fluid conduit to the second fluid conduit in the interior of the wellbore. The expected amount of wellbore fluid displaced and returned to the surface through the second fluid conduit is equivalent to the amount introduced into the wellbore through the first fluid conduit. Parts of the wellbore that are fluidly isolated do not support circulation.

Drilling muds that are not water based tend to dehydrate and lose additives during drilling operations. Dehydrated and additive-poor residues can collect in lower-flow velocity parts as solids, gels and highly viscous fluids. "Filter cake" is a layer of deposited solids and gelled drilling fluid that adheres to the interior surfaces of the wellbore, including the wellbore wall and the exterior of the fluid conduit. Drilling muds of appropriate density, viscosity, and other properties are required for the beneficial drilling of wellbores in hydrocarbon-bearing reservoirs.

Bentonite clay is a major component in drilling fluid and any drilling fluid must have certain properties that facilitate safe and satisfactory completion of a well. Consumption of bentonite clay in drilling operations in Saudi Arabia alone can reach over 100 thousand tons per year, and substantially all of the bentonite is imported from outside of the country.

SUMMARY

The disclosure presents modified bentonite compositions, which in some embodiments meet the American Petroleum Institute's (API's) specifications for drilling mud. The modifications can include both physical and chemical treatments with the use of one or more polymers to achieve certain API specifications. Modified bentonite can be used as a drilling mud additive according to the disclosure presented as follows. A local bentonite outcrop (bentonite local to Saudi Arabia, particularly in the Khulais area, 70 kilometers north of Jeddah and adjacent to Makkah-Madinah road) was modified in-house to meet the American Petroleum Institute (API)'s specifications for drilling mud. The modification includes both physical and chemical treatments with the use of PAC™-R polymer to achieve API specifications. The modified bentonite can now be used as a drilling mud additive according to the collected analysis data.

The properties of local bentonite can be improved economically by adding materials to prepared drilling muds to enhance viscosity and filtration loss, including materials such as carboxymethyl cellulose (CMC), DRISPAC® polymer (a multifunctional polyanionic cellulose polymer), and bentonite extenders. Also, shearing speed can be used as an enhancement method to improve the dispersion rate of clay suspensions, and hence increase viscosity and decrease filtration loss. A bentonite extender can be either a salt or a polymer, and it enhances viscosity buildup by slightly flocculating the bentonite suspension.

Therefore as disclosed, embodiments include a method for modifying bentonite to allow the bentonite to be useful in drilling mud applications. The method includes the steps of preparing bentonite local to Saudi Arabia using raw water to remove contaminants from the bentonite; grinding the bentonite to a fine powder; sieving the fine powder to be between about 50 μm and about 150 μm in particle size to produce a sieved fine powder; mixing the sieved fine powder with polyanionic cellulose polymer to produce a modified bentonite composition; adding the modified bentonite composition to water until a homogeneous solution of modified bentonite in water is formed; and allowing the homogeneous solution of modified bentonite in water to sit at rest to form a composition useful in drilling mud applications.

In some embodiments, the homogeneous solution of modified bentonite in water is formed in about 20 minutes. In other embodiments, the composition useful in drilling mud applications substantially meets the American Petroleum Institute's (API's) requirements for drilling mud. Still in other embodiments, the bentonite local to Saudi Arabia is a sodium-type bentonite and no hydroxide compositions are used in the method for modifying bentonite.

In some other embodiments, the bentonite local to Saudi Arabia comprises by weight percent about 58% sodium montmorillonite, about 5% feldspar, about 25% $SiO_2$, about 8% kaolinite, about 2% halite, and about 2% illite. In certain embodiments, the modified bentonite composition comprises by weight percent about 71% sodium montmorillonite, about 5% feldspar, about 15% $SiO_2$, about 6% kaolinite, about 0% halite, and about 1% illite.

Still in other embodiments, the method includes the step of verifying that viscosity of the homogeneous solution of modified bentonite in water substantially meets the API's requirements for viscosity of drilling mud. In other embodiments, the method includes the step of mixing the sieved fine powder with low viscosity sodium carboxymethyl cellulose. In some embodiments, the modified bentonite composition comprises between about 3% and about 11% polyanionic cellulose polymer by weight. Still in other embodiments, the modified bentonite composition comprises between about 4% and about 10% polyanionic cellulose polymer by weight. In yet other embodiments, the modified bentonite composition comprises between about 4% and about 9% polyanionic cellulose polymer by weight. In certain embodiments, the modified bentonite composition comprises between about 5% and about 8% polyanionic cellulose polymer by weight.

Still in yet other embodiments, the modified bentonite composition comprises about 8.5% polyanionic cellulose polymer by weight. In some embodiments, the polyanionic cellulose polymer comprises at least a first polyanionic cellulose polymer and a second polyanionic cellulose polymer. Some embodiments of the method include the step of conducting x-ray powder diffraction (XRD) to verify that the composition useful in drilling mud applications substantially meets the API requirements for drilling mud. In certain embodiments, the method includes the step of applying the composition useful in drilling mud applications to a wellbore hydrocarbon recovery operation.

Still in yet other embodiments of the method, the step of allowing the homogeneous solution of modified bentonite in water to sit at rest to form a composition useful in drilling mud applications continues for about 16 hours.

Additionally disclosed is a modified bentonite composition useful in drilling mud applications, the composition comprising: a powdery mixture composition comprising: about 90% by weight bentonite local to Saudi Arabia, the bentonite existing as a fine powder, the fine powder to be between about 50 μm and about 150 μm in particle size, and about 10% by weight polyanionic cellulose polymer; and water.

In some embodiments, the powdery mixture composition comprises by weight percent about 71% sodium montmorillonite, about 5% feldspar, about 15% $SiO_2$, about 6% kaolinite, about 0% halite, and about 1% illite. Still in other embodiments, the modified bentonite composition substantially meets the API's requirements for drilling mud. In yet other embodiments, the composition comprises soda ash.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions of and methods for making modified non-API bentonite, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Bentonite is an absorbent aluminum phyllosilicate, essentially impure clay consisting mostly of montmorillonite. Montmorillonite is the most abundant of the smectite clay minerals. A good quality bentonite contains mainly smectites (montmorillonite) and secondary minerals such as quartz, calcite, and micas. Bentonites come about in numerous forms on the market. In industry, montmorillonites are generally classified as sodium (Na), or calcium (Ca) types, depending on which exchangeable ion is dominant. Bentonite has certain characteristics such as negative electric charge, fine size, and very high specific surface area, and high sensitivity to hydration. Bentonite's functions in drilling mud include the control of the flow properties and the filtration rate of drilling fluids in drilling operations, which are important aspects of drilling fluid technology.

Desirable rheological properties include a high shear thinning viscosity. In other words, the higher the shear rate, the lower the viscosity, and there is a relatively high gel strength with a high ratio of yield point to plastic viscosity for cuttings transport and suspension.

Figure 1:
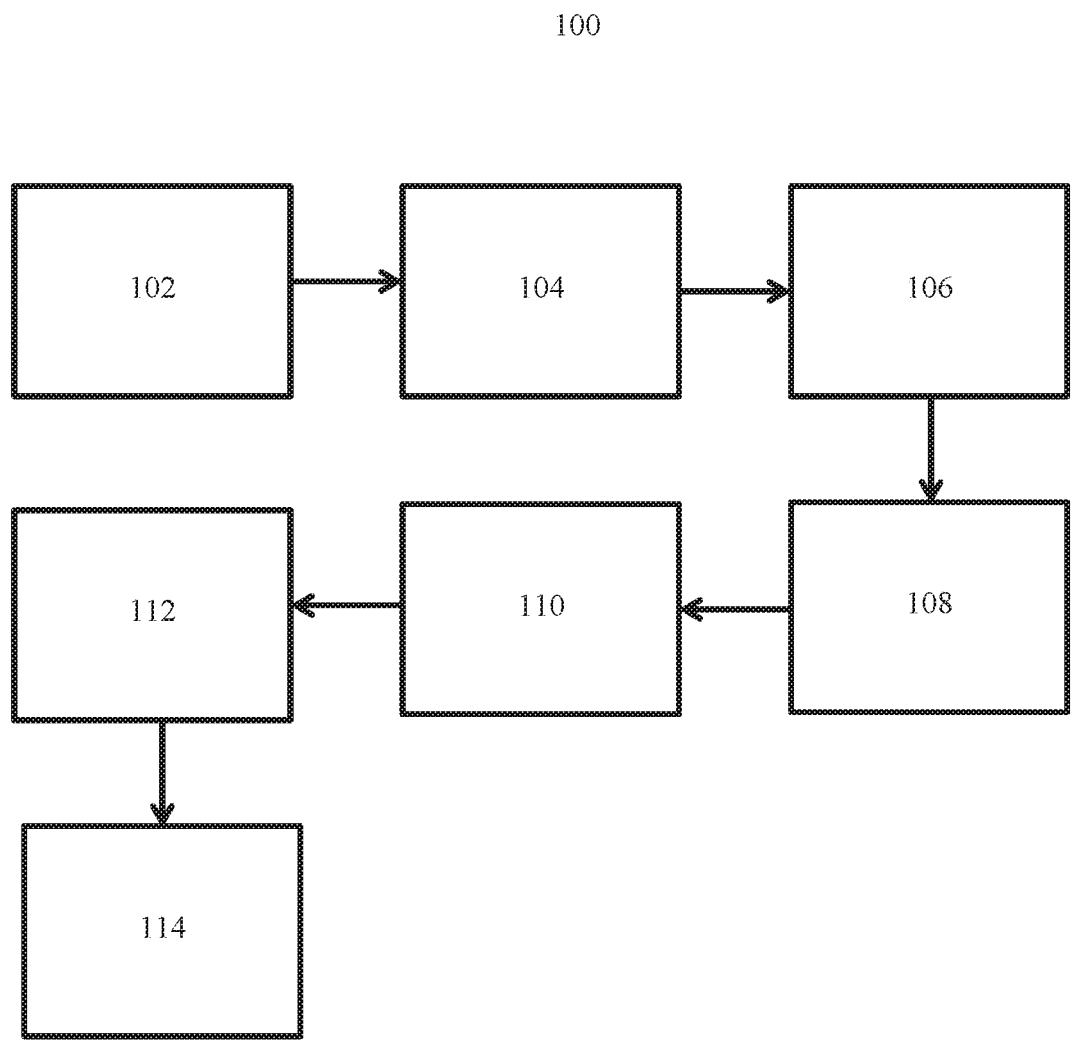
FIG. 1 shows a process diagram for one embodiment of a method to modify non-American Petroleum Institute (API) bentonite into a composition suitable for a drilling mud according to API standards.

Referring now to FIG. 1, a process diagram is shown for one embodiment of a method to modify non-American Petroleum Institute (API) bentonite into a composition suitable for a drilling mud according to API standards. In process 100, unmodified bentonite, local to Saudi Arabia and not meeting API standards for use in drilling mud, was cleaned and rinsed with raw water to remove contaminants at step 102. At step 104, the cleaned and rinsed unmodified bentonite was ground to a very fine powder using a Mortar Grinder RM 200 by Retsch®. At step 106, the ground unmodified bentonite was sieved to about 75 μm (200 mesh)

particle size using an electronic sieve shaker column. At step 108, the sieved unmodified bentonite was mixed with polyanionic cellulose polymer (PAC™-R) at a weight ratio of about 91.5% by weight unmodified bentonite to about 8.5% by weight PAC™-R polymer.

Bentonite ore is normally accompanied by other mineral materials which vary in amount and composition according to the location at which the bentonite is mined or quarried. Some common impurities in bentonite, to be removed by water, are clay-sized silica, gypsum, illite, and non-crystalline compounds.

PAC™-R polymer is a product of Halliburton and is a modified natural polyanionic cellulosic polymer that is a white, free-flowing powder. PAC™-R polymer is composed largely of carboxymethylcellulose sodium salt. While the specification and examples discuss the use of PAC™-R polymer, one of ordinary skill in the art would understand other suitable polymers could be used in the embodiments of the present disclosure, either in addition to or alternative to PAC™-R polymer. At step 110, the mixture of sieved unmodified bentonite and PAC™-R polymer (the mixture also being referred to as "modified bentonite" throughout) was added to distilled water and mixed until the solution became homogeneous, after about 20 minutes. At step 112, the modified bentonite in water (an example drilling solution) was covered and stored overnight for about 16 hours.

At step 114, the modified bentonite was analyzed according to API specifications for bentonite drilling mud. The analysis shows that the modified bentonite is similar to the commercially available bentonite.

Table 1 compares certain properties of bentonite that meets the American Petroleum Institute's standards for making drilling mud with modified "local bentonite" or bentonite local to Saudi Arabia that has been modified with PAC™-R polymer. In some embodiments of the present disclosure, because bentonite local to Saudi Arabia is a sodium-type bentonite, no sodium hydroxide is used or required for modifying the bentonite.

TABLE 1

Physical properties of modified bentonite local to Saudi Arabia versus commercially available bentonite.

API Bentonite VS. Modified Local Bentonite

| | Viscosity centipoise (cp) | | | Plastic Viscosity (PV) (cp) | Yield Point (YP) (lbs./100 ft.²) | b ratio YP:PV | dispersed Plastic Viscosity (cp) |
|---|---|---|---|---|---|---|---|
| | 600 | 300 | pH | | | | |
| API bentonite | 71 | 43.5 | 7.6 | 27.5 | 16 | 0.58 | 25 |
| Local bentonite | 68.5 | 44 | 8.4 | 24.5 | 19.5 | 0.79 | 25 |

Table 2 provides x-ray powder diffraction (XRD) data comparing the compositions of unmodified bentonite local to Saudi Arabia and modified bentonite (using PAC™-R polymer) local to Saudi Arabia. XRD is an analysis technique used for clay minerals identification. For the unmodified sample, after the preliminary removal of sand, clay was separated from silt by using a centrifugation technique. XRD patterns were obtained for air-dried samples and for samples treated with ethylene glycol vapor or heated to 350° C. and 550° C. Diffraction patterns were compared with standards for identification of minerals.

Samples of API bentonite, non-API bentonite, and modified non-API bentonite were analyzed by XRD. The samples were crushed to fine powder by grinding in a McCrone Micronizing mill. The samples were identified by the three major peaks of individual compounds shown in Table 2 below and in FIG. 2. The quantification of the identified compounds was performed by using the area under each of the major peaks. A sample of bentonite containing known concentration of components was analyzed to calculate the concentration by area of the peaks, because the areas corresponded to actual known values. Then, the non-API bentonite sample and modified non-API bentonite sample were tested. Component concentrations were calculated by area of the peaks. The sodium montmorillonite peak was modified and the area under the peak was increased for the modified non-API bentonite ("Treated Bentonite" in FIG. 2). The quartz concentration was reduced for the modified non-API bentonite sample. The feldspar concentration was largely unaffected, and clay minerals were also largely unaffected.

TABLE 2

XRD data comparing the compositions of unmodified bentonite local to Saudi Arabia and modified bentonite (using PAC™-R polymer) local to Saudi Arabia.

| Phase Identified | API Bentonite Weight % | Untreated non-API Bentonite Weight % | Modified (Treated) Bentonite Weight % |
|---|---|---|---|
| Na Montmorillonite | 74 | 58 | 71 |
| Cristoballite - SiO₂ | 16 | n/a | n/a |
| Feldspar | 8 | 5 | 5 |
| Quartz-SiO₂ | 2 | 25 | 15 |
| Kaolinite-Al₂Si₂O₅(OH)₄ | n/a | 8 | 6 |
| Halite-NaCl | n/a | 2 | 0 |
| Illite | 2 | 2 | 1 |

The identification of the crystalline mineral phases was achieved using X'Pert HighScore software by PANalytical. Semi-quantification of XRD data was performed by using JADE software by MDI Products based on the area of the peaks. The relative approximate values of the crystalline phases are listed in Table 2.

Figure 2:
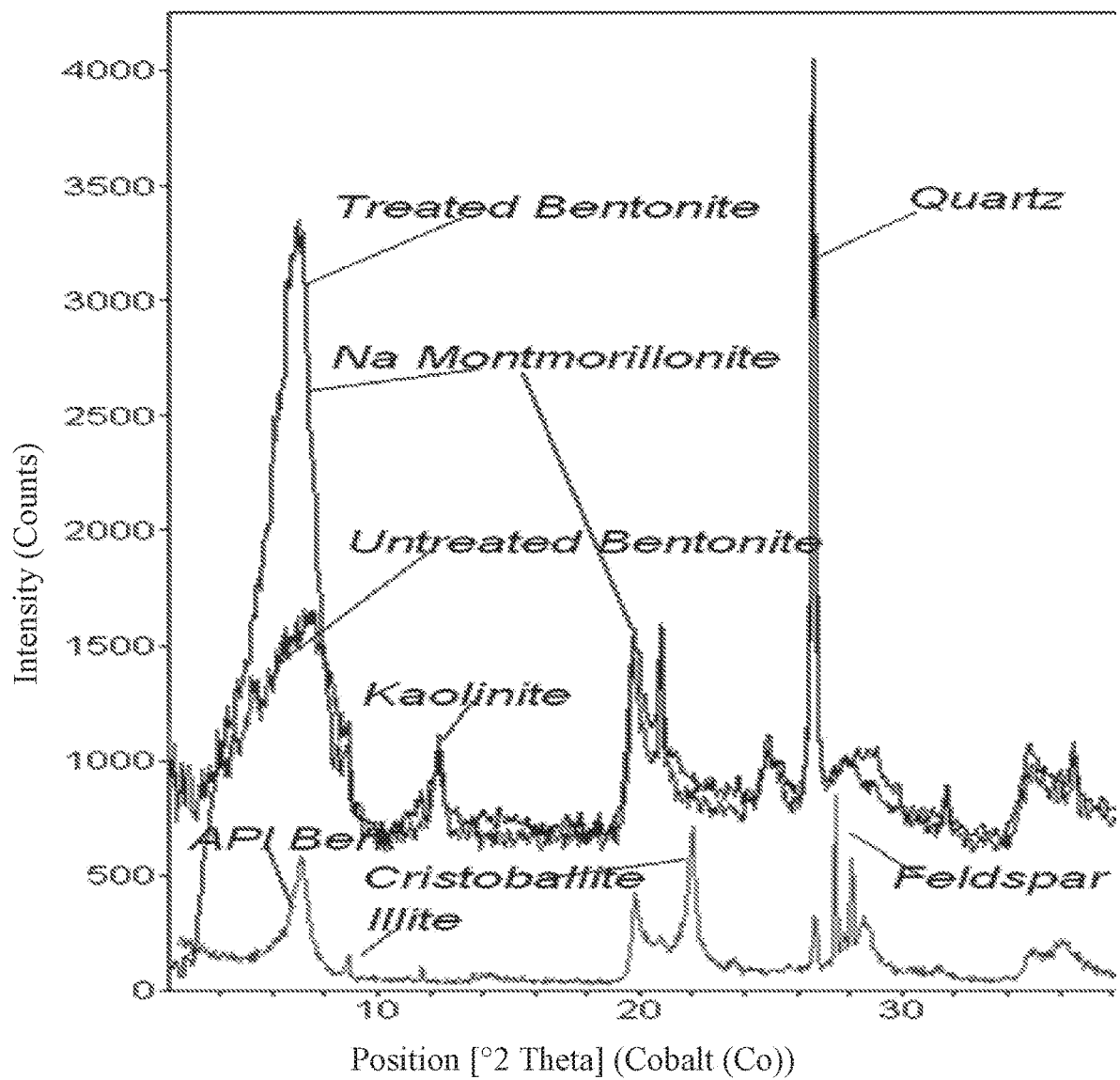
FIG. 2 shows a diffractogram comparing the compositions of a sample of API bentonite, a sample of non-API bentonite ("Untreated Bentonite"), and a sample of modified non-API bentonite ("Treated Bentonite").

FIG. 2 shows a diffractogram comparing the compositions of a sample of API bentonite, a sample of non-API bentonite, and a sample of modified non-API bentonite. Table 3 shows a comparison of data for five unmodified bentonite samples, local to Saudi Arabia (collected at different locations and different depths), and their properties. As shown, many of the properties do not meet required specifications, such as yield, dispersed plastic viscosity, dispersed filtrate, the methylene blue test, and the residue on 100 mesh (dry).

There were four main tests that were carried out to determine the rheological properties of the bentonite according to the API specifications. For the yield point:plastic viscosity ratio, the viscosity of samples at 600 rpm and 300 rpm were measured by using the Fan Viscometer device. After measuring the viscosity, the yield point:plastic viscosity ratio was calculated. The pH value of the samples were tested. To test dispersed plastic viscosity, sodium hexametaphosphate (10 wt. %) was prepared and 5 μl was added to the modified non-API bentonite. After that, the viscosity at 600 rpm and 300 rpm were measured again. The dispersed plastic viscosity is calculated by taking the difference between the viscosity at 600 rpm and the viscosity at 300 rpm.

To measure dispersed filtrate volume, the sample was pressurized by nitrogen gas to about 100 psi. The filtered water coming out of the pressurized cell was collected after 7.5 minutes of the starting of the nitrogen pressure until 30 minutes had elapsed. Finally, the volume of the water was multiplied by 2 to calculate the filtrate volume.

TABLE 3

Properties of five unmodified non-API bentonite samples.

| Tests | Unit | # 1 | # 2 | # 3 | # 4 | # 5 | Mean | Internal Required Specs. |
|---|---|---|---|---|---|---|---|---|
| Yield | Barrel/Short Ton | 27.59 | 37.24 | 27.59 | 26.95 | 27.59 | 29.39 | Minimum 90.0 |
| Moisture Content | % by wt. | 9.0 | 8.6 | 8.6 | 9.1 | 8.3 | 8.72 | Maximum 13.0 |
| Ratio of Yield Point:Plastic Viscosity (b) | | −0.50 | 0.0 | 0.0 | 0.0 | −3.0 | −0.70 | Maximum 1.50 |
| Dispersed Plastic Viscosity | Centipoise | 1.0 | 1.0 | 1.0 | 1.0 | 1.0 | 1.0 | Minimum 10.0 |
| Dispersed Filtrate | ml/30 min | 46.0 | 42.0 | 30.0 | 54.0 | 50.0 | 44.4 | Maximum 12.50 |
| Cement Contamination | pH | 8.62 | 8.51 | 8.89 | 8.47 | 8.69 | 8.636 | Maximum 9 |
| Methylene blue Test (MTB) | meq/100 g | 100 | 95 | 100 | 100 | 100 | 99.0 | Minimum 65.0 |
| Residue on 200 mesh (wet) | % by wt. | 0.69 | 0.64 | 0.72 | 0.75 | 0.65 | 0.69 | Maximum 2.50 |
| Residue on 100 mesh (Dry) | % by wt. | 81.52 | 87.26 | 71.33 | 68.07 | 65.31 | 74.69 | Maximum 2.00 |

Table 4 shows data comparing five samples of modified non-API bentonite, where the bentonite was modified with low viscosity sodium carboxymethyl cellulose (CMC-LV). During modification, the viscosity at both 300 and 600 rpm, pH value, plastic viscosity (cp), and yield point (lbs./100 ft.$^2$) were modified to meet API specifications.

Table 3 describes yield of unmodified non-API bentonite whereas Table 4 describes the yield point of modified non-API bentonite. Yield is calculated using a yield test, and certain internal minimum specification requirements are 90 barrel/short ton. For yield point, certain internal maximum specification requirements include a maximum ratio of 1.5 yield point:plastic viscosity.

TABLE 4

Evaluation of five modified bentonite samples.

| Sample # | Total (g) | Bentonite (g) | Soda ash wt. % | PAC ™-R wt. % | CMC wt. % |
|---|---|---|---|---|---|
| 1 | 30 | 27.6 | 1% | 3% | 4% |
| 2 | 30 | 27.3 | 1% | 3% | 5% |
| 3 | 30 | 27 | 1% | 3% | 6% |
| 4 | 30 | 26.7 | 1% | 3% | 7% |
| 5 | 30 | 26.4 | 1% | 3% | 8% |

| | Viscosity (cp) | | | plastic viscosity | yield point | |
|---|---|---|---|---|---|---|
| Sample # | 600 | 300 | pH | (cp) | (lbs./100 ft$^2$) | b |
| 1 | 37.5 | 22 | 7.44 | 15.5 | 6.5 | 0.41 |
| 2 | 41 | 26 | 8.14 | 15 | 11 | 0.73 |
| 3 | 39.5 | 23 | 7.92 | 16.5 | 6.5 | 0.39 |
| 4 | 47.5 | 28.5 | 7.9 | 19 | 9.5 | 0.5 |
| 5 | 46 | 27.5 | 7.89 | 18.5 | 9 | 0.48 |

Table 5 shows certain effects of grain size on the modified non-API bentonite performance.

TABLE 5

Effect of grain size on the modified non-API bentonite.

| | | | Particle | | | Viscosity (cp) | |
|---|---|---|---|---|---|---|---|
| # | Total Mass (g) | Bentonite (g) | size (mesh) | PAC wt. % | CMC wt. % | 600 | 300 |
| 1 | 30 | 26.625 | 1 | 3.75% | 7.50% | 30 | 16 |
| 2 | 30 | 26.625 | 50 | 3.75% | 7.50% | 38 | 21 |
| 3 | 30 | 26.625 | 100 | 3.75% | 7.50% | 43.5 | 24.5 |
| 4 | 30 | 26.625 | 140 | 3.75% | 7.50% | 44.5 | 25.5 |
| 5 | 30 | 26.625 | 200 | 3.75% | 7.50% | 50 | 30 |

Table 6 shows certain effects of soda ash on the modified non-API bentonite performance.

TABLE 6

Certain effects of soda ash concentration on modified non-API bentonite.

| # | Total (g) | Bentonite (g) | Soda ash wt. % | PAC ™-R wt. % | CMC wt. % |
|---|---|---|---|---|---|
| 1 | 30 | 27.3 | 1% | 3% | 5% |
| 2 | 30 | 27.15 | 1.5% | 3% | 5% |
| 3 | 30 | 27 | 2% | 3% | 5% |
| 4 | 30 | 26.85 | 2.5% | 3% | 5% |
| 5 | 30 | 26.7 | 3% | 3% | 5% |

| | Viscosity (cp) | | | plastic viscosity | yield point | |
|---|---|---|---|---|---|---|
| | 600 | 300 | pH | (cp) | (lbs./100 ft$^2$) | b |
| 1 | 41 | 26 | 8.14 | 15 | 11 | 0.7333 |
| 2 | 49 | 31 | 8.47 | 18 | 13 | 0.7222 |
| 3 | 60.5 | 41 | 8.78 | 19.5 | 21.5 | 1.1026 |
| 4 | 55 | 37 | 8.93 | 18 | 19 | 1.0556 |
| 5 | 60.5 | 42.5 | 9.3 | 18 | 24.5 | 1.3611 |

Table 7 shows certain effects of PAC™-R concentration on modified non-API bentonite.

TABLE 7

Effects of PAC™-R concentration on modified non-API bentonite.

| # | Total (g) | Bentonite (g) | Soda ash wt. % | PAC™-R wt. % | CMC wt. % |
|---|---|---|---|---|---|
| 1 | 30 | 27.9 | 1% | 1% | 5% |
| 2 | 30 | 27.6 | 1% | 2% | 5% |
| 3 | 30 | 27.3 | 1% | 3% | 5% |
| 4 | 30 | 27 | 1% | 4% | 5% |
| 5 | 30 | 26.7 | 1% | 5% | 5% |

| | Viscosity (cp) | | | Plastic viscosity | yield point | |
|---|---|---|---|---|---|---|
| # | 600 | 300 | pH | (cp) | (lbs./100 ft$^2$) | b |
| 1 | 20 | 11 | 8.1 | 9 | 2 | 0.2222 |
| 2 | 34 | 19 | 8.02 | 15 | 4 | 0.2667 |
| 3 | 41 | 26 | 8.14 | 15 | 11 | 0.7333 |
| 4 | 50 | 31.5 | 7.46 | 18.5 | 13 | 0.7027 |
| 5 | 68.5 | 44 | 8.44 | 24.5 | 19.5 | 0.7959 |

TABLE 8

Evaluation for modified non-API bentonite sample (8.5% PAC™-R added).

| | Yield Test | | | Internal Requirement |
|---|---|---|---|---|
| Concentration | 20 ppb | 22.5 ppb | 24 ppb | Min 90 Barrel/Short Ton |
| Viscosity at 600 rpm | 40 | 53 | 59 | Yield |
| Apparent viscosity | 20 cp | 26.5 cp | 29.5 cp | |
| Yield | | 113.88 Barrel/Short Ton | | |
| | Yield Point/Plastic Viscosity Ratio Test | | | Required Specification |
| Viscosity at 600 rpm | | 66 | | Max 1.5 YP/PV Ratio |
| Viscosity at 300 rpm | | 42 | | |
| Plastic Viscosity Ratio | | 22 cp | | |
| Yield Point | | 22 lbs./100 sq. ft. | | |
| YP/PV Ratio | | 1 | | |
| | Dispersed Plastic Viscosity & Filtrate Test | | | Required Specification |
| Viscosity at 600 rpm | | 65 | | Min 10 cp |
| Viscosity at 300 rpm | | 42 | | |
| Dispersed Plastic Viscosity | | 23 cp | | |
| Dispersed Filtrate | | 10 ml/30 min | | Max 12.5 ml/30 min |
| | Cement Contamination Test | | | Required Specification |
| pH After Aging | | 8.6 | | Max 9 |
| | Residue on 100 mesh (dry) Test | | | Required Specification |
| Residue on 100 mesh (dry) | | 0.15 wt. % | | Max 2 |
| | Moisture Test | | | Required Specification |
| Moisture | | 10.2 wt. % | | Max 13 |
| | Residue on 200 mesh (wet) Test | | | Required Specification |
| Residue on 200 mesh (wet) | | 0.12 wt. % | | Max 2.5 |
| | MBT (Active Clay) | | | |
| MBT (Active Clay) | | 122 lb/bbl | | |
| | Peroxide Test | | | |
| | RHEOLOGY @ ROOM-TEMPERATURE ON | | | Treated Bentonite Pre-hydrated in: |
| | FANN-36 VISCOMETER | | Water | Hydrogen |
| After Static Aging for 70 | 600 rpm | | 72 | 6 |
| Hrs at Room Temperature | 300 rpm | | 46 | 4 |
| | 200 rpm | | 36 | 3 |
| | 100 rpm | | 24 | 2 |
| | 6 rpm | | 4 | 1 |
| | 3 rpm | | 2 | 1 |
| | PV | | 26 | 2 |
| | VP | | 20 | 2 |

In Table 8, dispersed filtrate is according to API Standard 13A which outlines the test procedure used for drilling fluids. Fluid loss is a measure of bentonite slurry's ability to form a low permeability filter cake. The max internal requirement for testing was 12.5 ml/30 min.

Advantageously in the embodiments of the present disclosure, raw water was used to remove contaminants from unmodified bentonite before its modification by carboxymethylcellulose. Acid was not used to remove contaminants to avoid any negative effect on the chemical properties of bentonite ore. Notably, commercial bentonite was not used in the preparation recipe. PAC™-R polymer was used to enhance the viscosity of the bentonite ore in water. In certain embodiments, other additives were not used to enhance the viscosity of the bentonite ore.

The addition of soda ash shows a positive effect in terms of plastic viscosity; however, as the amount of soda ash is increased, the pH of the composition increases as well.

The singular forms "a," "an," and "the" include plural referents, unless the context clearly dictates otherwise.

In the drawings and specification, there have been disclosed embodiments of compositions of and methods for making modified bentonite, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

Where the Specification or the appended Claims provide a range of values, it is understood that the interval encompasses each intervening value between the upper limit and the lower limit as well as the upper limit and the lower limit. The present disclosure encompasses and bounds smaller ranges of the interval subject to any specific exclusion provided. Where the Specification and appended Claims reference a method comprising two or more defined steps, the defined steps can be carried out in any order or simultaneously except where the context excludes that possibility.

That claimed is:

1. A modified bentonite composition useful in drilling mud applications, the composition comprising:
    a powdery mixture composition comprising:
        bentonite local to the Khulais area of Saudi Arabia, the bentonite having been ground to a fine powder, the ground fine powder between about 50 μm and about 150 μm in particle size,
        a first polymer comprising polyanionic cellulose polymer with carboxymethylcellulose sodium salt, the first polymer present at about at least 3% by weight of the powdery mixture composition, the first polymer having a first viscosity in water, and
        a second polymer comprising carboxymethylcellulose, the second polymer having a second viscosity in water, where the second viscosity is lesser than the first viscosity; and
    water, where a ratio of yield point to plastic viscosity for the modified bentonite composition after static aging for at least 16 hours is between about at least 0.73 and about 1.10, with a pH between about 8.14 and about 8.93, the pH controlled in part by an amount of soda ash between about 1% by weight and about 2.5% by weight of the powdery mixture composition, and is sufficient for cuttings transport and suspension in the drilling mud applications, the modified bentonite composition not being modified by sodium hydroxide.

2. The composition according to claim 1, wherein crystalline mineral phases of the powdery mixture composition comprise by weight percent about 71% sodium montmorillonite, about 5% feldspar, about 15% $SiO_2$, about 6% kaolinite, about 0% halite, and about 1% illite.

3. The composition according to claim 1, wherein the modified bentonite composition substantially meets the API's requirements for drilling mud.

4. The composition according to claim 1, wherein the powdery mixture composition comprises between about 4% and about 10% of the first polymer by weight.

5. The composition according to claim 1, wherein the powdery mixture composition comprises between about 4% and about 9% of the first polymer by weight.

6. The composition according to claim 1, wherein the powdery mixture composition comprises between about 5% and about 8% of the first polymer by weight.

7. The composition according to claim 1, wherein the powdery mixture composition comprises about 8.5% of the first polymer by weight.

* * * * *